(12) United States Patent
Gwilt et al.

(10) Patent No.: US 8,667,199 B2
(45) Date of Patent: Mar. 4, 2014

(54) DATA PROCESSING APPARATUS AND METHOD FOR PERFORMING MULTI-CYCLE ARBITRATION

(75) Inventors: David John Gwilt, Cambridge (GB); Graeme Leslie Ingram, Royston (GB)

(73) Assignee: ARM Limited, Cambridge (GB)

( * ) Notice: Subject to any disclaimer, the term of this patent is extended or adjusted under 35 U.S.C. 154(b) by 1278 days.

(21) Appl. No.: 12/076,391

(22) Filed: Mar. 18, 2008

(65) Prior Publication Data
US 2008/0235707 A1    Sep. 25, 2008

(30) Foreign Application Priority Data
Mar. 22, 2007  (GB) .................................. 0705536.1

(51) Int. Cl.
*G06F 12/00*    (2006.01)
(52) U.S. Cl.
USPC .......................................... 710/240; 710/243
(58) Field of Classification Search
USPC ......... 710/28, 39, 40, 45, 112, 113, 116, 305, 710/306, 309, 310, 240, 241, 243, 244
See application file for complete search history.

(56) References Cited

U.S. PATENT DOCUMENTS

| | | | | |
|---|---|---|---|---|
| 5,375,215 A | * | 12/1994 | Hanawa et al. | 711/169 |
| 5,473,762 A | * | 12/1995 | Krein et al. | 710/107 |
| 5,710,891 A | * | 1/1998 | Normoyle et al. | 710/119 |
| 5,815,674 A | * | 9/1998 | LaBerge | 710/107 |
| 5,901,295 A | * | 5/1999 | Yazdy | 710/113 |
| 6,286,068 B1 | * | 9/2001 | Arimilli et al. | 710/107 |

(Continued)

FOREIGN PATENT DOCUMENTS

| | | |
|---|---|---|
| CN | 1301364 | 6/2001 |
| JP | 7-49830 | 2/1995 |

(Continued)

OTHER PUBLICATIONS

AMBA Arbiter Data Sheet, Copyright 1995-1997 ARM Limited.*

(Continued)

*Primary Examiner* — Khanh Dang
(74) *Attorney, Agent, or Firm* — Nixon & Vanderhye P.C.

(57) ABSTRACT

A data processing apparatus and method are provided for arbitrating between multiple access requests seeking to access a plurality of resources sharing a common access path. At least one logic element issues access requests requesting access to the resources, and each access request identifies which of the resources is to be accessed. Arbitration circuitry performs a multi-cycle arbitration operation to arbitrate between multiple access requests to be passed over the common access path, the arbitration circuitry having a plurality of pipeline stages to allow a corresponding plurality of multi-cycle arbitration operations to be in progress at any one time. Filter circuitry is provided which has a plurality of filter states, the number of filter states being dependent on the number of pipeline stages of the arbitration circuitry, and each resource being associated with one of the filter states. For a new multi-cycle arbitration operation to be performed by the arbitration circuitry, the filter circuitry selects one of the filter states that has not been selected for any other multi-cycle arbitration operation already in progress within the pipeline states of the arbitration circuitry. Then, it determines as candidate access requests for the new multi-cycle arbitration operation those access requests that are seeking to access a resource associated with the selected filter state. Such an approach allows efficient multi-cycle arbitration to take place even where the resources may have inter-access timing parameters associated therewith which prevent them from being able to receive access requests every clock cycle.

11 Claims, 4 Drawing Sheets

(56) References Cited

U.S. PATENT DOCUMENTS

| | | | |
|---|---|---|---|
| 6,820,152 B2 * | 11/2004 | Kanzaki et al. | 710/244 |
| 6,950,892 B2 | 9/2005 | Bell, Jr. et al. | |
| 7,120,714 B2 * | 10/2006 | O'Connor et al. | 710/243 |
| 7,130,946 B2 * | 10/2006 | Abhay et al. | 710/242 |
| 2001/0005869 A1 * | 6/2001 | Yamada et al. | 710/107 |
| 2004/0243752 A1 | 12/2004 | O'Connor et al. | |
| 2005/0091432 A1 * | 4/2005 | Adams et al. | 710/100 |

FOREIGN PATENT DOCUMENTS

| | | |
|---|---|---|
| JP | 2002-268942 | 9/2002 |
| JP | 2003-271545 | 9/2003 |
| JP | 2004-318876 | 11/2004 |
| JP | 2006-11593 | 1/2006 |
| WO | WO 99/13405 | 3/1999 |

OTHER PUBLICATIONS

Search Report for GB 0705536.1 dated May 4, 2007.
English translation of the text of the First Office Action issued Jun. 8, 2011 in CN 200810087374.6.
English translation of Official Action mailed Aug. 2, 2011 in JP 2008-073601.

* cited by examiner

DATA PROCESSING APPARATUS AND METHOD FOR PERFORMING MULTI-CYCLE ARBITRATION

This application claims priority to GB Application No. 0705536.1 filed 22 Mar. 2007, the entire contents of which are incorporated herein by reference.

BACKGROUND OF THE INVENTION

1. Field of the Invention

The present invention relates to a data processing apparatus and method for performing multi-cycle arbitration, and in particular for performing such arbitration between multiple access requests to be passed over a common access path shared by a plurality of resources.

2. Description of the Prior Art

In a data processing apparatus, it is often the case that a plurality of resources within the data processing apparatus share a common access path (also referred to herein as a shared access path). For example, multiple logic elements within the data processing apparatus, for example multiple master devices, may share access to memory consisting of one or more memory devices, with each of those memory devices comprising a plurality of memory banks. In this example, each bank of a memory device can be considered to be a shared resource. Typically, access to such memory is controlled by a memory controller, such that any access requests issued by the various logic elements seeking access to the memory will be received by the memory controller, typically the memory controller including a queue for buffering access requests prior to issuing them to the memory. Often, there is a single connection path between the memory controller and the memory, and accordingly this connection path forms a common access path to the plurality of banks contained within the memory.

As another example of a shared access path, many data processing apparatus provide interconnect circuitry for coupling the various master logic units and slave logic units provided within the apparatus, with the interconnect circuitry providing a plurality of connection paths over which communication between the master logic units and slave logic units can be established. Often, certain of the connection paths are shared between multiple logic units, as for example is typically the case in a single layer interconnect.

As another example of a shared access path, a number of peripheral devices may be connected to a peripheral bus. Often the peripheral bus will be connected to a main system bus via bridge circuitry, and any access requests destined for those peripheral devices will first be received by the bridge circuitry, which will then issue the access requests one at a time over the peripheral bus to the appropriate peripheral device. Since only one access request can be propagated-via the peripheral bus at any particular time, the peripheral bus forms a shared access path.

The above three examples of the occurrence of shared access paths within a data processing apparatus are provided merely by way of example, and are not intended to represent an exhaustive list of situations where shared access paths arise within a data processing apparatus.

Wherever such a shared access path exists, it will typically be necessary to provide arbitration circuitry for performing an arbitration operation to arbitrate between multiple access requests to be passed over that shared access path.

As the operating frequency of components of the data processing apparatus is increased, it becomes more and more difficult for the required arbitration operation to be performed in a single clock cycle. Accordingly, it is becoming necessary to provide arbitration circuitry that performs the arbitration operation as a multi-cycle operation. In order to achieve continuous throughput, arbitration of a subsequent access must begin before the outcome of the preceding arbitration operation is known. To achieve this, the arbitration circuitry can be provided with a plurality of pipeline stages to allow a corresponding plurality of multi-cycle arbitration operations to be in progress at any one time.

However, often the resources sharing the common access path are such that they are unable to receive an access request every clock cycle. Indeed, once an access request has been granted access to a particular resource via the arbitration operation, the inter-access timing parameters associated with that resource may make that resource inaccessible for a number of clock cycles. Accordingly, it would be desirable to ensure that during that period the arbitration circuitry does not grant access to another access request seeking to access that particular shared resource.

However, when using the pipelined arbitration approach discussed above, multiple arbitration operations will typically be in progress at the same time, and hence for any particular arbitration operation in progress within the pipeline, it will not typically be possible to know the outcome of the one or more arbitration operations ahead of that particular arbitration operation in the pipeline at the time a decision needs to be made by that particular arbitration operation. Accordingly it is possible that multiple iterations of the arbitration operation in progress within the pipeline stages of the arbitration circuitry will grant access to access requests seeking to access the same shared resource. As a result, it is possible that an access request granted access by the arbitration circuitry may subsequently be stalled awaiting access to a shared resource, due to the above-mentioned inter-access timing parameter restrictions, and if this occurs this will clearly impact performance.

Accordingly, it would be desirable to provide an improved technique for arbitrating between multiple access requests seeking to access a plurality of resources sharing a common access path, in situations where arbitration is performed as a multi-cycle operation.

SUMMARY OF THE INVENTION

Viewed from a first aspect, the present invention provides a data processing apparatus comprising: a plurality of resources sharing a common access path; at least one logic element for issuing access requests requesting access to said resources, each access request identifying which of said resources is to be accessed; arbitration circuitry for performing a multi-cycle arbitration operation to arbitrate between multiple access requests to be passed over the common access path, the arbitration circuitry having a plurality of pipeline stages to allow a corresponding plurality of multi-cycle arbitration operations to be in progress at any one time; filter circuitry having a plurality of filter states, the number of filter states being dependent on the number of pipeline stages of said arbitration circuitry, and each resource being associated with one of said filter states; for a new multi-cycle arbitration operation to be performed by said arbitration circuitry, the filter circuitry selecting one of said filter states that has not been selected for any other multi-cycle arbitration operation already in progress within the pipeline stages of the arbitration circuitry, and determining as candidate access requests for the new multi-cycle arbitration operation those access requests that are seeking to access a resource associated with said selected filter state.

In accordance with the present invention, filter circuitry is provided having a plurality of filter states, with the number of filter states being dependent on the number of pipeline stages within the arbitration circuitry. Each of the resources that shares the common access path is then associated with one of those filter states.

Then, for a new multi-cycle arbitration operation to be performed by the arbitration circuitry, the filter circuitry selects one of the filter states that has not been selected for any other multi-cycle arbitration operation already in progress within the arbitration circuitry, and based on that selected filter state then determines as candidate access requests for the arbitration operation those access requests that are seeking to access a resource associated with that selected filter state.

Since any particular resource is only associated with one of the filter states, and the filter circuitry selects for the new arbitration operation a filter state that has not been selected for any other arbitration operation already in progress, this ensures that the new arbitration operation will only select amongst access requests seeking to access a resource which will not be accessed by any of the winning access requests of other arbitration operations already in progress within the arbitration circuitry.

Accordingly, by such an approach, the likelihood of any particular multi-cycle arbitration operation selecting as a winning access request an access request that then subsequently becomes stalled due to inter-access timing parameters is significantly reduced. Indeed, assuming the number of clock cycles required between accesses by any particular resource is less than or equal to the number of cycles to perform the multi-cycle arbitration operation (which is dependent on the pipeline depth), then such an approach will ensure that such stalling does not occur, since the inter-access timing parameters of each resource will always be met.

In addition to taking account of the filter states that have already been selected for any other multi-cycle arbitration operation already in progress within the pipeline stages of the arbitration circuitry, the filter circuitry can also be arranged when selecting one of the filter states to take account of the resources seeking to be accessed by the access requests. For example, if there are four filter states 0, 1, 2 and 3, and filter states 0 and 1 have already been selected for multi-cycle arbitration operations in progress within the pipeline, then for the new multi-cycle arbitration operation the filter circuitry may choose between filter states 2 and 3. However, if the access requests awaiting arbitration are all seeking to access one or more resources associated with filter state 3, then in this embodiment the filter circuitry will select filter state 3 in preference to selecting filter state 2, even though filter state 2 may have been the default filter state to select at this time. It will be appreciated that the above is merely one example of how the resources seeking to be accessed by the access requests can be taken into account by the filter circuitry, and there will be various other ways in which the resources could be taken into account. For example, the filter circuitry may decide, based on the access requests awaiting arbitration, to select the available filter state that enables the largest number of candidate access requests to be chosen, given the resources being accessed by the various access requests.

In one embodiment, the filter circuitry may be arranged to select a filter state for every new multi-cycle arbitration operation. However, in one embodiment, if at the time the new arbitration operation is to be started by said arbitration circuitry, there are no other multi-cycle arbitration operations already in progress within the pipeline stages of the arbitration circuitry, the filter circuitry is arranged not to select a filter state and instead to allow all access requests awaiting arbitration to be considered by the new multi-cycle arbitration operation. This allows a more efficient arbitration of the access requests awaiting arbitration in that particular scenario, since in that scenario there is no need to only arbitrate amongst a subset of the access requests awaiting arbitration.

The plurality of resources sharing a common access path can take a variety of forms. However, in one embodiment, said plurality of resources are provided by at least one memory device, and each shared resource comprises a bank of the at least one memory device. In one such embodiment, each filter state has associated therewith a subset of the banks, the arbitration circuitry is provided within a memory controller for the at least one memory device, and the shared access path comprises a path between the memory controller and the at least one memory device.

There are a number of different types of memory device that comprise multiple banks. In one embodiment, each memory device comprises a Dynamic Random Access Memory (DRAM) memory circuit comprising a plurality of banks. The DRAM may be embedded DRAM provided on-chip with the logic elements issuing the access requests, or alternatively may be off-chip DRAM. One particular type of DRAM that is often provided off-chip is Synchronous DRAM (SDRAM), SDRAM memory devices typically being synchronised with the clock speed that the processing device with which they are used is optimised for SDRAM memory typically consists of a plurality of separate chips, each such chip forming a separate memory device, and each chip comprising multiple banks. An access request issued to such SDRAM memory will specify an address, and one portion of the address will specify a particular chip of the SDRAM memory and another portion of the address will specify a particular bank of that chip. Additional portions of the address then specify a row and column within the identified bank.

In embodiments where each shared resource comprises a bank of a memory device, it will be appreciated that each bank will be associated with one of the filter states. Hence, by ensuring that the filter state selected for a new multi-cycle arbitration operation is different to any filter states chosen for other multi-cycle arbitration operations already in progress, it can be ensured that any candidate access requests for the new multi-cycle arbitration operation are not seeking to access the same bank as could be accessed by any of those other multi-cycle arbitration operations already in progress. Accordingly the fact that once a particular bank has been arbitrated for, it may then be inaccessible for a number of clock cycles, will not result in any performance problems, since another access request seeking to access that particular bank will not be selected during that period due to the manner in which the filter states are selected to choose candidate access requests for each iteration of the multi-cycle arbitration operation.

In one particular embodiment, the arbitration circuitry has two pipeline stages, the banks are identified by a bank address, and all of the banks of the at least one memory device having an even bank address are associated with a first filter state, and all of the banks of the at least one memory device having an odd bank address are associated with a second filter state. When the filter circuitry is reviewing the access requests awaiting arbitration to determine whether they are seeking to access an even bank or an odd bank, it is merely necessary to look at the least significant bit of the bank address specified by the access request.

It will be appreciated that for SDRAM memory consisting of multiple chips, a similar scheme could arrange all of the banks having an even chip address to be associated with a first filter state and all of the banks having an odd chip address to be associated with a second filter state, and again all that will be necessary is to review the least significant bit of the chip address portion of the address specified by the access request in order to determine whether an even chip or an odd chip is to be accessed by that access request.

In an alternative embodiment, each of the plurality of resources sharing a common access path comprise a peripheral unit connected to a peripheral bus, the arbitration circuitry is provided within bridge circuitry connecting the peripheral bus with interconnect circuitry over which the at least one logic element issues the access requests, and the shared access path comprises the peripheral bus.

As mentioned previously, it is typically the case that only one access request can be propagated over the peripheral bus at a time, and accordingly if multiple peripheral units are connected to the peripheral bus, there can be a need for arbitration within the bridge circuitry if multiple access requests are awaiting routing to the appropriate peripheral unit.

Often each peripheral unit will not be able to accept an access request every cycle. As an example, each of the peripheral units may only be able to accept one access every two cycles. Indeed in some embodiments, such peripheral units are operated at a slower clock frequency than the rest of the data processing apparatus, and hence these two slow clock cycles may equate to 2N fast clock cycles of the rest of the data processing apparatus, where N is the ratio between the fast clock cycles of the data processing apparatus and the slow clock cycles of the peripheral unit.

In both of the above memory bank and peripheral unit examples, the multiple access requests awaiting arbitration may have been issued from a single logic element, or from multiple different logic elements. In one embodiment, the access requests awaiting arbitration are held in a buffer within the arbitration circuitry. In particular, considering the memory chip example, the buffer may be provided within the memory controller containing the arbitration circuitry. Similarly, for the peripheral unit example, the buffer may be provided within the bridge circuitry containing the arbitration circuitry. The buffer may take a variety of forms, but in one embodiment is provided as a queue.

In accordance with another embodiment, a plurality of logic elements are connected with the plurality of resources via interconnect circuitry, the shared access path is a connection path within said interconnect circuitry that is shared between said plurality of resources, and the arbitration circuitry is provided within said interconnect circuitry to arbitrate between multiple access request issued by said plurality of logic elements and to be passed over said connection path.

In this example, the presence of the multiple access requests awaiting arbitration results from multiple logic elements issuing access requests at the same time. If the inter-access timing parameters associated with the various resources coupled to the connection path are such that they make a particular resource inaccessible for some clock cycles after it receives an access request, then again the use of the filter states in accordance with embodiments of the present invention can ensure that access requests are not granted access by the arbitration circuitry only to become stalled awaiting access to the resource.

Viewed from a second aspect, the present invention provides a method of arbitrating between multiple access requests seeking to access a plurality of resources sharing a common access path in a data processing apparatus, each access request identifying which of said resources is to be accessed, the method comprising the steps of: performing within arbitration circuitry a multi-cycle arbitration operation to arbitrate between multiple access requests to be passed over the common access path, the arbitration circuitry having a plurality of pipeline stages to allow a corresponding plurality of multi-cycle arbitration operations to be in progress at any one time; providing a plurality of filter states, the number of filter states being dependent on the number of pipeline stages of said arbitration circuitry, and each resource being associated with one of said filter states; for a new multi-cycle arbitration operation to be performed by said arbitration circuitry, selecting one of said filter states that has not been selected for any other multi-cycle arbitration operation already in progress within the pipeline stages of the arbitration circuitry, and determining as candidate access requests for the new multi-cycle arbitration operation those access requests that are seeking to access a resource associated with said selected filter state.

Viewed from a third aspect, the present invention provides a data processing apparatus comprising: a plurality of resource means sharing a common access path; at least one logic means for issuing access requests requesting access to said resource means, each access request identifying which of said resource means is to be accessed; arbitration means for performing a multi-cycle arbitration operation to arbitrate between multiple access requests to be passed over the common access path, the arbitration means having a plurality of pipeline stage means for allowing a corresponding plurality of multi-cycle arbitration operations to be in progress at any one time; filter means having a plurality of filter states, the number of filter states being dependent on the number of pipeline stage means of said arbitration means, and each resource means being associated with one of said filter states; for a new multi-cycle arbitration operation to be performed by said arbitration means, the filter means selecting one of said filter states that has not been selected for any other multi-cycle arbitration operation already in progress within the pipeline stage means of the arbitration means, and determining as candidate access requests for the new multi-cycle arbitration operation those access requests that are seeking to access a resource means associated with said selected filter state.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
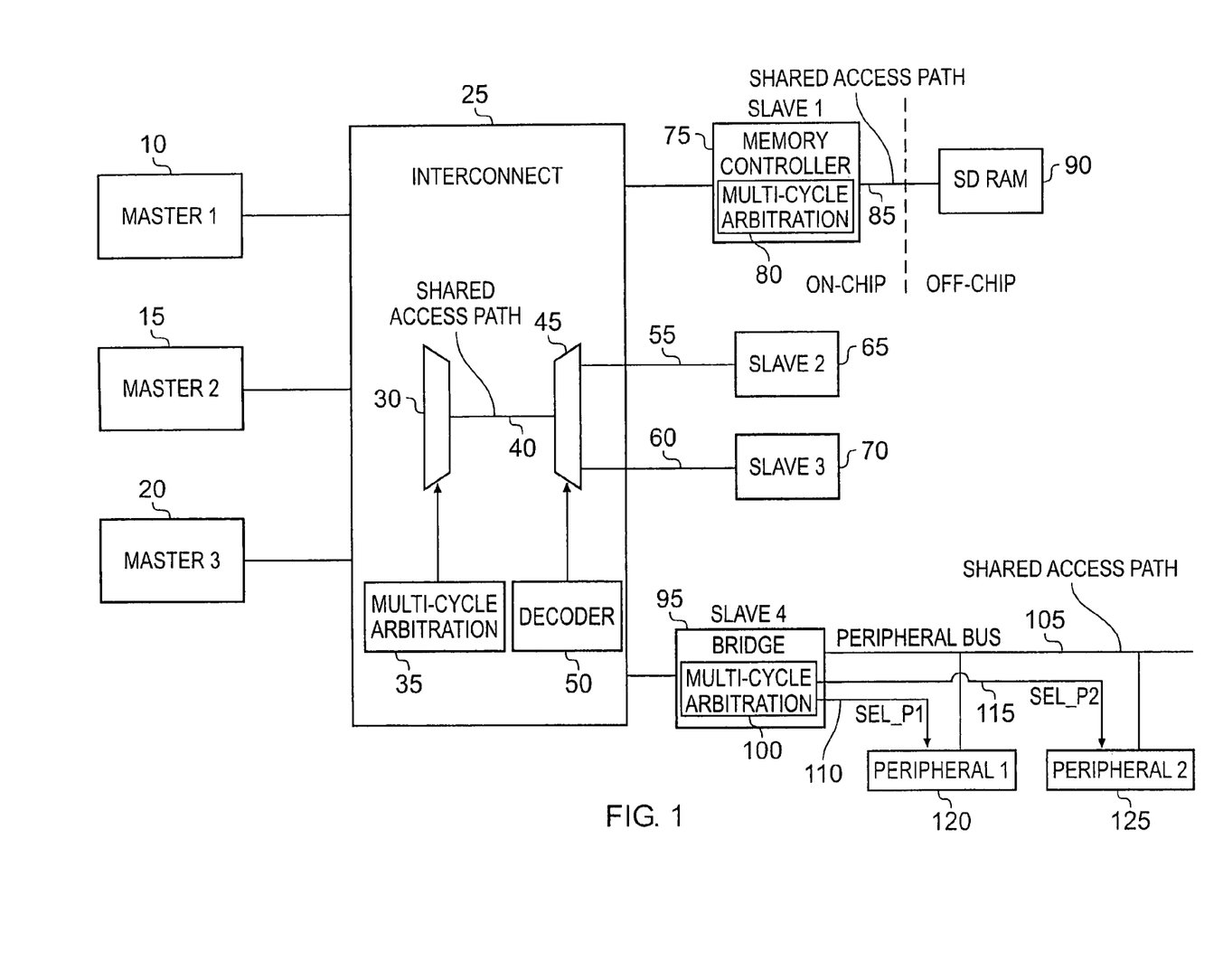
FIG. 1 is a block diagram of a data processing apparatus in accordance with one embodiment of the present invention.

FIG. 1 is a block diagram of a data processing apparatus in accordance with one embodiment of the present invention, and illustrates a variety of places within the data processing apparatus where multi-cycle arbitration may be performed. However, it will be understood that the arbitration circuitry and filter circuitry of embodiments of the present invention can be used at any location within a data processing apparatus where a plurality of resources share a common access path.

By way of illustration of one particular embodiment of the present invention, a data processing apparatus will be considered with reference to FIG. 1 having a plurality of master logic units 10, 15, 20 coupled via interconnect circuitry 25 with a plurality of slave logic units 65, 70, 75, 95. Interconnect circuitry typically provides a plurality of connection paths for coupling the various master logic units and slave logic units, to enable transactions to be performed. Each transaction typically consists of an address transfer from a master logic unit to a slave logic unit, and one or more data transfers between the master logic unit and the slave logic unit. For a write transaction, these data transfers will pass from the master logic unit to the slave logic unit (in some implementations there will additionally be a write response transfer from the slave logic unit to the master logic unit), whilst for a read transaction these data transfers will pass from the slave logic unit to the master logic unit.

The manner in which the various transfers of each transaction are routed via the connection paths of the interconnect circuitry will be dependent on the bus protocol employed within the interconnect circuitry. Two known types of bus protocol are the non-split transaction protocol, where there is a fixed timing relationship between the address transfer of a transaction and the subsequent one or more data transfers of that transaction, and the split transaction protocol in which separate address channels and data channels are provided, and the timing of data transfers is decoupled with respect to the timing of address transfers of a particular transaction.

In one embodiment of the present invention, the interconnect circuitry has a single layer interconnect structure, and within the interconnect circuitry 25 of FIG. 1, a particular portion of that single layer structure is shown. In particular, a portion of the structure is shown whereby any of the three master logic units 10, 15, 20 may access slave logic unit two 65 or slave logic unit three 70. A multiplexer 30 is arranged to receive any access requests issued by the master logic units 10, 15, 20, such access requests for example being an address transfer initiating a transaction. An arbiter 35 applying a multi-cycle arbitration operation is used to control the multiplexer 30 so as to arbitrate between the multiple access requests issued by the master logic units 10, 15, 20 and in particular to arbitrate their use of the shared access path 40. Similarly, decoder 50 is provided for controlling the de-multiplexer 45 so as to route any particular access request to the appropriate target slave logic unit 65, 70 via the associated paths 55, 60, respectively.

If the interconnect uses a split transaction bus protocol, it will be appreciated that the structure illustrated in FIG. 1 within the interconnect 25 will be replicated for each of the separate address and data channels within the interconnect 25.

As also shown in FIG. 1, one of the slave logic units may be a memory controller 75 used to interface with an off-chip memory such as an SDRAM 90. Any access requests issued by the various master logic units 10, 15, 20 will be queued within the memory controller 75 and then output one at a time over the shared access path 85 to the SDRAM 90. To arbitrate access to the shared access path 85, an arbiter 80 may be provided within the memory controller 75 to perform a multi-cycle arbitration operation.

As also shown in FIG. 1, one of the slave logic units may be a bridge circuit 95 which receives access requests routed via the interconnect 25, and then outputs those access requests via a peripheral bus 105 to an appropriate one of the peripheral devices 120, 125 connected to that peripheral bus. Only one access request can be output over the peripheral bus at any particular point in time, and accordingly the peripheral bus 105 is a shared access path for the various peripheral devices 120, 125. Typically, a select signal is output in association with any particular access request to identify the peripheral device that is to receive that access request. Accordingly, if an access request output on the peripheral bus 105 is to be received by peripheral device 120, then a corresponding select signal will be issued over path 110, whereas if the access request is to be received by peripheral device 125, then the select signal will be output over path 115.

If the bridge 95 is allowed to receive access requests from the interconnect circuitry 25 at a higher rate than it can output them over the peripheral bus, it may be provided with a queue mechanism in order to store access requests awaiting dispatch over the peripheral bus. In such situations, an arbiter 100 can be provided within the bridge circuitry 95 for performing a multi-cycle arbitration operation to arbitrate amongst the access requests.

From the above description of FIG. 1, three example locations of where multi-cycle arbitration may be required have been described. It will be appreciated that these are not the only locations within a data processing apparatus where such multi-cycle arbitration may be required, and are intended merely to provide some examples of where such arbitration could be needed.

As mentioned previously, due to the fact that data processing systems are tending to be operated at higher and higher frequencies, this has led to the need for arbitration to be performed in multiple cycles, since it is often the case that the required arbitration operation cannot be performed within a single cycle when the data processing apparatus is run at such high frequencies. To maintain throughput, each arbiter 35, 80, 100 can be arranged in a pipelined manner so as to have a plurality of pipeline stages to allow a corresponding plurality of multi-cycle arbitration operations to be in progress at any one time. This enables continuous throughput through the arbiter to be achieved, but a side effect of this approach is that arbitration of a subsequent access-must beg in before the outcome of a previous arbitration is known.

A problem that can arise with such an approach is that the various resources coupled to the shared access path may not be able to receive access requests every clock cycle, and indeed once arbitrated for, inter-access timing parameters associated with those resources may make a particular resource inaccessible for some subsequent number of clock cycles. In order to maintain high throughput, it is beneficial to not select as a winning access request of the arbitration process an access request destined for a resource which is already busy and cannot accept that access request, as this will merely cause the winning access request to be stalled due to the above mentioned inter-access timing parameter restrictions. In accordance with embodiments of the present invention, this problem is alleviated through the use of a filter mechanism in association with the arbitration circuitry as will be discussed in more detail below.

Figure 2:
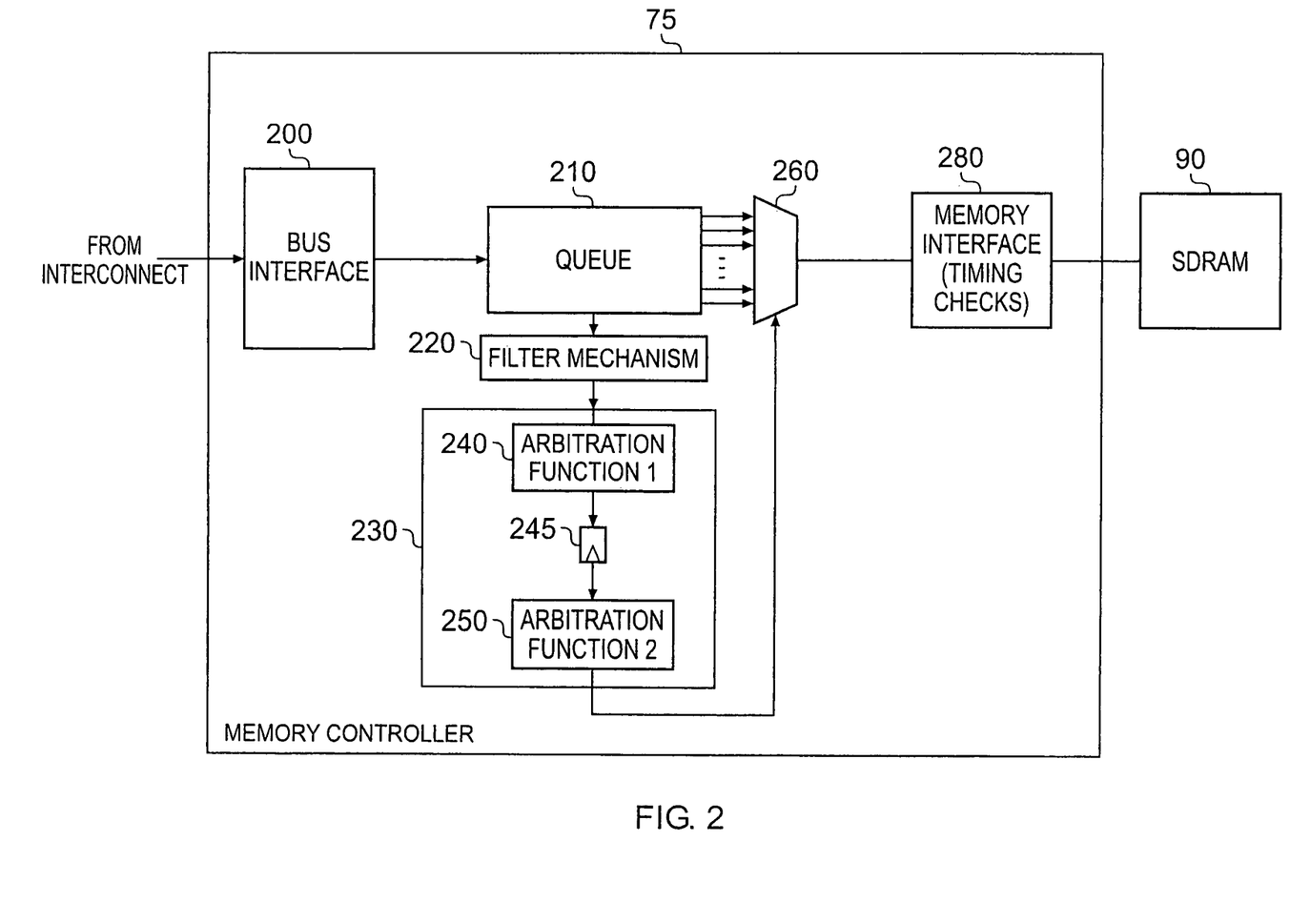
FIG. 2 is a block diagram illustrating in more detail the memory controller 75 of FIG. 1 in accordance with one embodiment of the present invention.

In particular, for the purposes of illustration, the operation of the arbiter 80 within the memory controller 75 will be considered in more detail now with reference to FIG. 2. The SDRAM 90 will typically consist of a plurality of chips, each chip typically having a plurality of banks, and each bank having a number of addressable rows and columns in which data can be stored. Hence, in this example, the plurality of resources sharing access to the common access path 85 are the various banks provided within the SDRAM 90.

As shown in FIG. 2, a bus interface 200 is provided within the memory controller 75 for interfacing with the interconnect circuitry 25, and accordingly any access requests issued by any of the master logic units 10, 15, 20 to the SDRAM 90 are first received by the bus interface 200 of the memory controller 75 from the interconnect 25. Thereafter, these access requests are placed within a queue 210. An arbiter 230 is arranged to perform a multi-cycle arbitration operation in order to generate an appropriate control signal for the multiplexer 260, such that each time the arbitration operation is performed, one of the access requests in the queue is selected as a winning access request and forwarded to the memory interface 280 for routing to the SDRAM 90. The memory interface 280 performs timing checks with regards to each access request prior to issuing them to the SDRAM 90.

As shown in FIG. 2, a filter mechanism 220 is provided in accordance with embodiments of the present invention for reviewing the access requests in the queue 210, and determining which of those access requests to forward to the arbiter 230 for arbitration. The filter mechanism 220 has a plurality of filter states, and the number of filter states is dependent on the number of pipeline stages of the arbitration circuitry. In this example, the arbitration circuitry 230 is shown as having two pipeline stages 240, 250 separated by a registering element 245 used to store the output from the first pipeline stage 240 at the end of one clock cycle, prior to that output then being input to the second pipeline stage 250 in the next clock cycle. The first pipeline stage 240 performs a first arbitration function, and the second pipeline stage then performs a second arbitration function, these first and second arbitration functions collectively performing the required arbitration operation. In this example where two pipeline stages are provided, there will typically be two filter states provided for the filter mechanism 220.

Each of the resources sharing a common access path is then associated with one of the filter states of the filter mechanism. As mentioned earlier, each bank of the SDRAM 90 can be considered to be a separate resource, and accordingly each bank is associated with one of the filter states.

Then, when a new iteration of the arbitration operation is to be performed by the arbitration circuitry 230, the filter circuitry 220 selects one of the filter states that has not been selected for any other iteration, of the arbitration operation already in progress within the pipeline stage of the arbitration circuitry. The filter mechanism 220 then reviews the access requests in the queue 210 to determine which resource each access request is destined for, and selects as candidate access requests those access requests that are seeking to access a resource associated with the selected filter state.

Accordingly, considering the particular example of FIG. 2 where the arbiter 230 has two pipeline stages, then the filter mechanism 220 will determine as the filter state for the iteration of the arbitration operation about to enter the first pipeline stage 240 the filter state that has not been used in association with the iteration of the arbitration operation about to enter the second pipeline stage 250. As a result, it can be ensured that the candidate access requests being considered by the iteration of the arbitration operation entering the first pipeline stage 240 will not be seeking to access any resource that might be accessed by the winning access request determined via the iteration of the arbitration operation in the second pipeline stage 250. Hence, this ensures that the same SDRAM bank will not be selected for access in two successive cycles. This will reduce the risk of an access issued to the SDRAM 90 stalling. Indeed, if the inter-access timing parameters of each bank allow it to receive an access every two cycles, then no such stalling will occur since no one bank will ever receive more than one access request every two cycles in accordance with the above-described technique. This is possible even though it is not known which bank has been selected in a first access at the time of making the decision about a second access, since the use of the plurality of filter states ensures that the same bank is not accessed in two successive cycles.

Figure 3A:
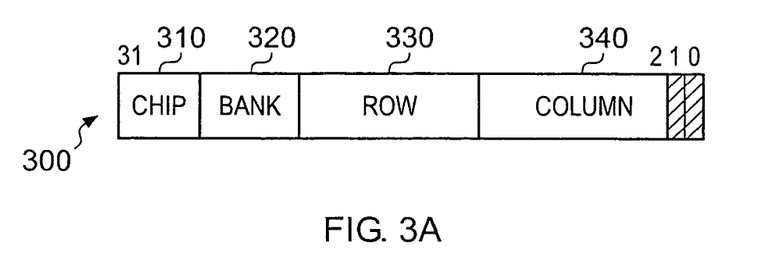
FIG. 3A schematically illustrates the portions of an address provided by an access request seeking to access the SDRAM 90 of FIG. 1.

FIG. 3A schematically illustrates the fields provided within an address 300 issued by an access request seeking to access the SDRAM 90. In this example, the address is a 32-bit address, and has a field 310 identifying the particular chip of the SDRAM 90 to be accessed, a field 320 identifying the particular bank within that chip to be accessed, a field 330 identifying a row of the selected bank, and field 340 identifying a column of the selected bank. In this example, it is assumed that data is accessed in the SDRAM 90 in 32-bit quantities, and accordingly the least significant two bits of the address are not relevant (since these two bits merely identify particular bytes within the 32-bit quantity).

Figure 3B:
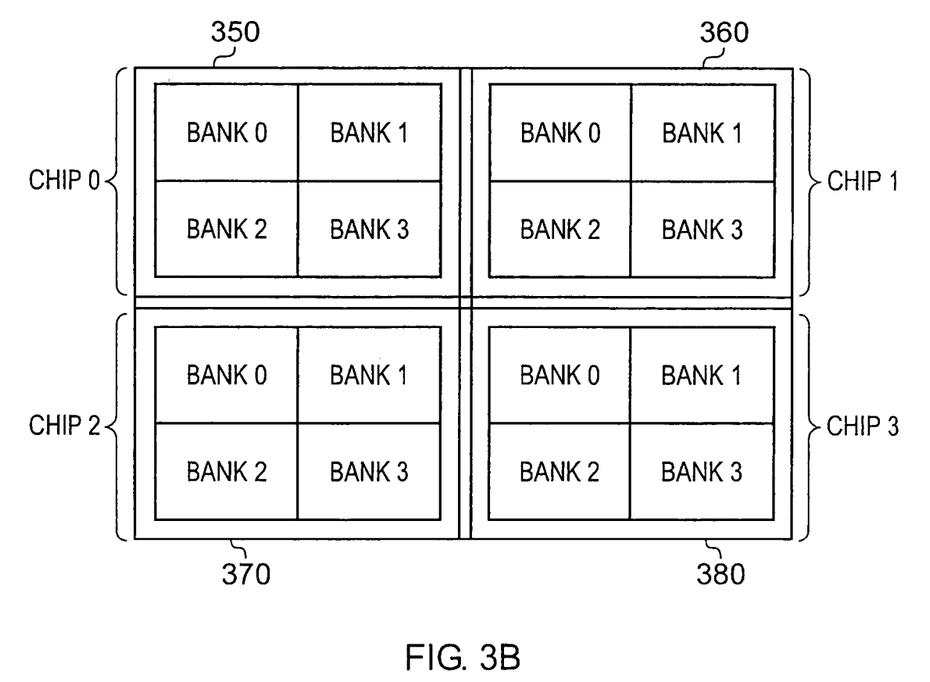
FIG. 3B is a diagram schematically illustrating the chips and banks provided within the SDRAM 90 of FIG. 1 in accordance with one embodiment of the present invention.

FIG. 3B illustrates a particular example of the SDRAM 90, where the SDRAM has four chips 350, 360, 370, 380, each of which contains four banks. Accordingly, in this example, the chip field 310 of the address will be two bits in length, and the bank field 320 of the address will be two bits in length.

As mentioned earlier with reference to FIG. 2, in the example of FIG. 2 where the arbiter has two pipeline stages, there will typically be two filter states associated with the filter mechanism 220. In one embodiment, one filter state is associated with banks having an even bank address and the other filter state is associated with banks having an odd bank address. Accordingly, considering the example of FIG. 3B, banks 0 and 2 will be associated with one filter state, and banks 1 and 3 will be associated with the other filter state, and when analysing the access requests in the queue 210, the filter mechanism 220 merely needs to look at the least significant bit of the bank field 320 in order to assess whether an even bank or an odd bank is being accessed.

In an alternative embodiment, one filter state may be associated with chips at an even chip address, and the other filter state may be associated with chips at an odd chip address. Again, considering the example of FIG. 3B, it would merely then be necessary for the filter mechanism 220 to look at the least significant bit of the chip field 310 in order to determine whether chips 0 or 2 were being accessed, or chips 1 or 3 were being accessed.

Furthermore, it will appreciated that if more than two pipeline stages were provided in the arbiter 230, then more than two filter states would be provided for the filter mechanism 220. As an example, if the arbiter 230 contained four pipeline stages, four filter states would be provided for the filter mechanism 220. Considering the example of FIG. 3B, each filter state could be associated with a particular bank, and the filter mechanism would then look at both bits of the bank field 320 of the address specified by an access request when determining which resource is to be accessed by that access request. Alternatively each filter state could be associated with a particular chip, and both bits of the chip field 310 could be analysed by the filter mechanism 220 when seeking to select candidate access requests for any particular iteration of the arbitration operation.

The arbitration mechanism provided within the bridge circuit 95 can be constructed similarly to the arbitration mechanism of the memory controller 75 of FIG. 2, and in particular could include the same queue 210, filter mechanism 220, arbiter 230 and multiplexer 260.

Considering the arbitration mechanism provided within the interconnect 25, there will not typically be any queue analogous to the queue 210, since the multiple access requests result from multiple of the master devices 10, 15, 20 asserting access requests at the same time as inputs to the multiplexer 30. The filter mechanism would merely be arranged to snoop particular bits of the addresses provided within the access requests routed to the multiplexer 30 in order to determine which resources were being accessed, and then to select the candidate access requests dependent on which filter state is being applied at the time, whereafter the arbiter 35 would then operate in the same manner as discussed with reference to the arbiter 230 of FIG. 2 in order to produce a control signal for the multiplexer 30.

Figure 4:
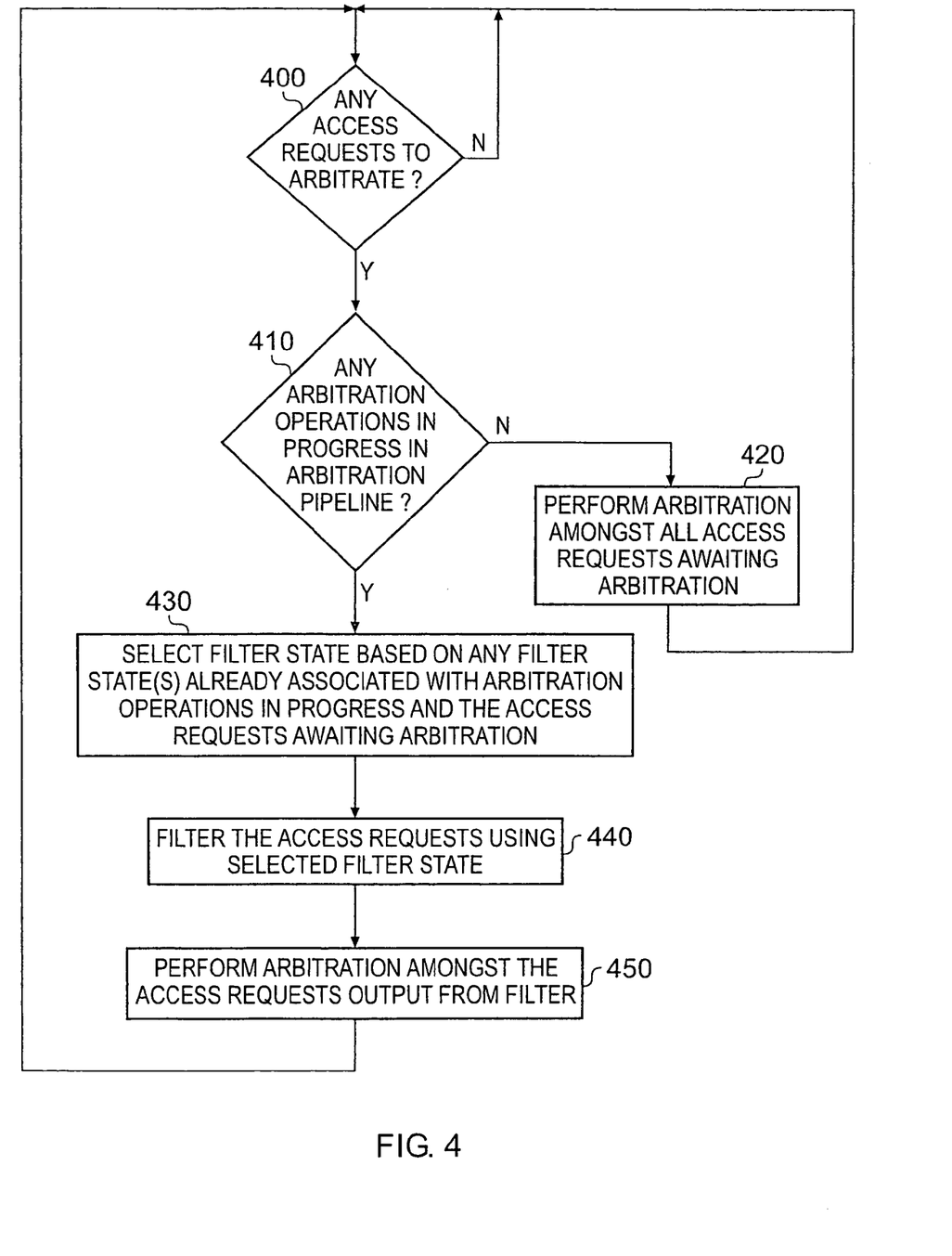
FIG. 4 is a flow diagram illustrating the operation of the arbitration circuitry and associated filter mechanism in accordance with one embodiment of the present invention.

FIG. 4 is a flow diagram illustrating the process that may be performed by an arbiter and associated filter mechanism in accordance with one embodiment of the present invention. At step 400, it is determined whether there are any access requests awaiting to be arbitrated. Assuming there are, then it is determined at step 410 whether there are currently any arbitration operations in progress within the pipeline stages of the arbiter. If not, then in accordance with the embodiment illustrated in FIG. 4, no filter state is selected, and instead at step 420 the arbiter performs arbitration amongst all of the access requests that are currently awaiting arbitration, whereafter the process returns to step 400.

However, if at step 410 it is determined that there is at least one arbitration operation in progress in the arbitration pipeline, then at step 430 the filter mechanism selects a filter state taking into account any filter states already associated with arbitration operations in progress in the arbiter. In particular, the filter mechanism will choose a filter state that is not currently being used by any such arbitration operations already in progress. Additionally, in accordance with the embodiment illustrated in FIG. 4, the filter mechanism will, assuming there is more than one filter state that it is allowed to select given the filter states associated with arbitration operations already in progress, choose a filter state having regard to the access requests awaiting arbitration. For example, if the filter mechanism is able to choose amongst two filter states, but all or a majority of the access requests awaiting arbitration are seeking to access resources associated with a particular one of those two filter states, then the filter mechanism will in this embodiment choose that particular filter state.

Thereafter, at step 440, the filter mechanism filters the access requests using the selected filter state in order to generate candidate access requests for consideration by the arbiter. In particular, of all of the access requests awaiting arbitration, the filter mechanism will only select as candidate access requests those access requests that are seeking to access a resource associated with the selected filter state.

Then, at step 450, the arbiter will perform arbitration amongst the candidate access requests output from the filter mechanism, whereafter the process will return to step 400.

From the above description of embodiments of the present invention, it will be appreciated that such embodiments allow high-frequency, pipelined, arbitration to take place without the potential for causing stalls in an accessed resource. For example, considering as resources the banks of an SDRAM memory, such techniques guarantee that the same bank will not be accessed in consecutive arbitration cycles. In particular, using the above described filter mechanism, even though the exact bank address that was selected in a first arbitration cycle will not be known in the next arbitration cycle, it can be guaranteed that the bank address selected in the next arbitration cycle will be different from that selected in the first arbitration cycle.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
a plurality of resources sharing a common access path;
at least one logic element for issuing to said common access path access requests requesting access to said resources, each access request identifying which of said resources is to be accessed;
arbitration circuitry, responsive to multiple access requests passed over said common access path, configured to perform a multi-cycle arbitration operation to arbitrate between said multiple access requests, the arbitration circuitry having a plurality of pipeline stages to allow a corresponding plurality of multi-cycle arbitration operations to be in progress at any one time, each pipeline stage performing a corresponding arbitration function such that the plurality of arbitration functions corresponding to the plurality of pipeline stages collectively perform the multi-cycle arbitration operation to select from said multiple access requests a winning access request to be granted access to its identified resource;
filter circuitry having a plurality of filter states, the number of filter states being dependent on the number of pipeline stages of said arbitration circuitry, and each resource being associated with one of said filter states;
for a new multi-cycle arbitration operation to be performed by said arbitration circuitry, the filter circuitry selecting one of said filter states that has not been selected for any other multi-cycle arbitration operation already in progress within the pipeline stages of the arbitration circuitry and for which the winning access request is not yet selected, determining as candidate access requests for the new multi-cycle arbitration operation those access requests that are seeking to access a resource associated with said selected filter state and providing said candidate access requests to the arbitration circuitry as said multiple access requests for the new multi-cycle arbitration operation.

2. A data processing apparatus as claimed in claim 1, wherein when selecting one of said filter states the filter circuitry additionally takes account of the resources seeking to be accessed by the access requests.

3. A data processing apparatus as claimed in claim 1, wherein if at the time the new arbitration operation is to be started by said arbitration circuitry, there are no other multi-cycle arbitration operations already in progress within the pipeline stages of the arbitration circuitry, the filter circuitry being arranged not to select a filter state and instead to allow all access requests awaiting arbitration to be considered by the new multi-cycle arbitration operation.

4. A data processing apparatus as claimed in claim 1, wherein:
said plurality of resources are provided by at least one memory device, and each shared resource comprises a bank of the at least one memory device;
each filter state has associated therewith a subset of the banks;
the arbitration circuitry is provided within a memory controller for the at least one memory device; and the shared access path comprises a path between the memory controller and the at least one memory device.

5. A data processing apparatus as claimed in claim 4, wherein:
each memory device comprises a dynamic RAM memory circuit comprising a plurality of banks.

6. A data processing apparatus as claimed in claim 4, wherein:
the arbitration circuitry has two pipeline stages;
the banks are identified by a bank address; and
all of the banks of the at least one memory device having an even bank address are associated with a first filter state, and all of the banks of the at least one memory device having an odd bank address are associated with a second filter state.

7. A data processing apparatus as claimed in claim 1, wherein:
each resource comprises a peripheral unit connected to a peripheral bus;
the arbitration circuitry is provided within bridge circuitry connecting the peripheral bus with interconnect circuitry over which the at least one logic element issues the access requests; and
the shared access path comprises the peripheral bus.

8. A data processing apparatus as claimed in claim 1, wherein the access requests awaiting arbitration are held in a buffer within the arbitration circuitry.

9. A data processing apparatus as claimed in claim 1, wherein:
said at least one logic element comprises a plurality of logic elements connected with said plurality of resources via interconnect circuitry;
the shared access path is a connection path within said interconnect circuitry that is shared between said plurality of resources; and
the arbitration circuitry is provided within said interconnect circuitry to arbitrate between multiple access request issued by said plurality of logic elements and to be passed over said connection path.

10. A method of arbitrating between multiple access requests seeking to access a plurality of resources sharing a common access path in a data processing apparatus, each access request identifying which of said resources is to be accessed, the method comprising the steps of:
performing within arbitration circuitry in response to multiple access requests passed over said common access path, a multi-cycle arbitration operation to arbitrate between multiple access requests to be passed over the common access path, the arbitration circuitry having a plurality of pipeline stages to allow a corresponding plurality of multi-cycle arbitration operations to be in progress at any one time;
providing a plurality of filter states, the number of filter states being dependent on the number of pipeline stages of said arbitration circuitry, and each resource being associated with one of said filter states;
for a new multi-cycle arbitration operation to be performed by said arbitration circuitry, selecting one of said filter states that has not been selected for any other multi-cycle arbitration operation already in progress within the pipeline stages of the arbitration circuitry, each pipeline stage performing a corresponding arbitration function such that the plurality of arbitration functions corresponding to the plurality of pipeline stages collectively perform the multi-cycle arbitration operation to select from said multiple access requests a winning access request to be granted access to its identified resource, and determining as candidate access requests for the new multi-cycle arbitration operation those access requests that are seeking to access a resource associated with said selected filter state, and providing said candidate access requests to the arbitration circuitry as said multiple access requests for the new multi-cycle arbitration operation.

11. A data processing apparatus comprising:
a plurality of resource means sharing a common access path;
at least one logic means for issuing to said common access path access requests requesting access to said resource means, each access request identifying which of said resource means is to be accessed;
arbitration means, responsive to multiple access requests passed over said common access path, for performing a multi-cycle arbitration operation to arbitrate between said multiple access requests, the arbitration means having a plurality of pipeline stage means for allowing a corresponding plurality of multi-cycle arbitration operations to be in progress at any one time, each pipeline stage means performing a corresponding arbitration function such that the plurality of arbitration functions corresponding to the plurality of pipeline stage means collectively perform the multi-cycle arbitration operation to select from said multiple access requests a winning access request to be granted access to its identified resource means;
filter means having a plurality of filter states, the number of filter states being dependent on the number of pipeline stage means of said arbitration means, and each resource means being associated with one of said filter states;
for a new multi-cycle arbitration operation to be performed by said arbitration means, the filter means selecting one of said filter states that has not been selected for any other multi-cycle arbitration operation already in progress within the pipeline stage means of the arbitration means and for which the winning access request is not yet selected, and determining as candidate access requests for the new multi-cycle arbitration operation those access requests that are seeking to access a resource means associated with said selected filter state, and providing said candidate access requests to the arbitration means as said multiple access requests for the new multi-cycle arbitration operation.

* * * * *